(12) United States Patent
Lee et al.

(10) Patent No.: US 8,411,001 B2
(45) Date of Patent: Apr. 2, 2013

(54) DISPLAY DEVICE WITH FLOATING BAR

(75) Inventors: Hee-Suk Lee, Cheonan-si (KR); Hyo-Taek Lim, Cheonan-si (KR); Zin-Taek Park, Cheonan-si (KR); Ju-Ho Park, Asan-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 459 days.

(21) Appl. No.: 11/542,911

(22) Filed: Oct. 4, 2006

(65) Prior Publication Data

US 2007/0109237 A1 May 17, 2007

(30) Foreign Application Priority Data

Nov. 14, 2005 (KR) .......................... 10-2005-0108449

(51) Int. Cl.
*G09G 3/36* (2006.01)
(52) U.S. Cl. ............................................. 345/87; 345/92
(58) Field of Classification Search .............. 345/87–92; 349/40

See application file for complete search history.

(56) References Cited

U.S. PATENT DOCUMENTS

| | | | | |
|---|---|---|---|---|
| 4,975,691 A * | 12/1990 | Lee | | 345/79 |
| 5,212,472 A * | 5/1993 | Takahashi et al. | | 345/60 |
| 5,220,443 A | 6/1993 | Noguchi | | |
| 5,805,246 A * | 9/1998 | Lee et al. | | 349/40 |
| 5,852,480 A * | 12/1998 | Yajima et al. | | 349/40 |
| 5,930,607 A * | 7/1999 | Satou | | 438/158 |
| 5,936,687 A * | 8/1999 | Lee | | 349/40 |
| 6,081,307 A * | 6/2000 | Ha | | 349/40 |
| 6,088,073 A | 7/2000 | Hioki et al. | | |
| 6,118,214 A * | 9/2000 | Marcotte | | 313/582 |
| 6,166,713 A * | 12/2000 | Asai et al. | | 345/92 |
| 6,333,769 B1 | 12/2001 | Suzuki et al. | | |
| 6,392,719 B2 * | 5/2002 | Kim | | 349/40 |
| 6,791,632 B2 | 9/2004 | Lee et al. | | |
| 2001/0028429 A1 * | 10/2001 | Wu | | 349/139 |
| 2001/0045997 A1 * | 11/2001 | Kim | | 349/40 |
| 2002/0027621 A1 * | 3/2002 | Chae | | 349/40 |
| 2002/0044228 A1 * | 4/2002 | Oh et al. | | 349/40 |
| 2002/0063676 A1 * | 5/2002 | Murade et al. | | 345/100 |
| 2003/0030054 A1 * | 2/2003 | Hector et al. | | 257/72 |

(Continued)

FOREIGN PATENT DOCUMENTS

| | | |
|---|---|---|
| CN | 1564060 | 1/2005 |
| CN | 1693942 | 11/2005 |

(Continued)

OTHER PUBLICATIONS

English Abstract for Publication No. CN 1564060.

(Continued)

*Primary Examiner* — Chanh Nguyen
*Assistant Examiner* — Robert Stone
(74) *Attorney, Agent, or Firm* — F. Chau & Associates, LLC (57) ABSTRACT

A display device includes a plurality of pixels, a data line transmitting a data voltage to the pixels, and a floating bar crossing the data line and being divided into a plurality of pieces. By dividing the floating bar into a plurality of pieces, a delay of a data signal can be prevented so that excellent images can be displayed. Furthermore, by disposing a diode between the pieces of the floating bar, an effect of dispersing static electricity can be maximized.

13 Claims, 5 Drawing Sheets

U.S. PATENT DOCUMENTS

| | | | |
|---|---|---|---|
| 2004/0032544 A1* | 2/2004 | Kim et al. | 349/40 |
| 2005/0180072 A1* | 8/2005 | Lai | 361/56 |
| 2005/0243043 A1* | 11/2005 | Jeoung et al. | 345/87 |
| 2006/0017672 A1* | 1/2006 | Aoki | 345/77 |
| 2006/0033857 A1* | 2/2006 | Kim et al. | 349/54 |
| 2007/0046845 A1* | 3/2007 | Liou et al. | 349/40 |

FOREIGN PATENT DOCUMENTS

| | | |
|---|---|---|
| JP | 06-202151 | 7/1994 |
| JP | 06-289428 | 10/1994 |
| JP | 10-010493 | 1/1998 |
| JP | 11-072806 | 3/1999 |
| JP | 2000-162629 | 6/2000 |
| JP | 2001-021918 | 1/2001 |
| JP | 2004-246202 | 9/2004 |
| JP | 2004-258388 | 9/2004 |
| JP | 2004-273732 | 9/2004 |
| KR | 1020000015308 A | 3/2000 |
| KR | 1020000056476 A | 9/2000 |
| KR | 1020010045688 A | 6/2001 |
| KR | 10-0303207 | 7/2001 |
| KR | 1020010055970 A | 7/2001 |
| KR | 1020040039640 A | 5/2004 |
| KR | 10-2004-0103283 | 12/2004 |
| KR | 10-2005-0024948 | 3/2005 |

OTHER PUBLICATIONS

English Abstract for Publication No. CN 1693942.
English Abstract for Publication No. 06-202151.
English Abstract for Publication No. 06-289428.
English Abstract for Publication No. 11-072806.
English Abstract for Publication No. 2000-162629.
English Abstract for Publication No. 2004-246202.
English Abstract for Publication No. 10-0303207.
English Abstract for Publication No. 10-2004-0103283.
English Abstract for Publication No. 10-2005-0024948.

* cited by examiner

DISPLAY DEVICE WITH FLOATING BAR

CROSS-REFERENCE TO RELATED APPLICATION

This application claims priority to and the benefit of Korean Patent Application No. 10-2005-0108449 filed in the Korean Intellectual Property Office on Nov. 14, 2005, the entire contents of which are incorporated herein by reference.

BACKGROUND OF THE INVENTION (a) Technical Field

The present disclosure relates to a display device, and more particularly to a structure of a floating bar of a display device.

(b) Discussion of the Related Art

Recently, instead of heavy and large cathode ray tubes (CRTs), flat panel displays, such as an organic light emitting diode (OLED) display, a plasma display panel (PDP), and a liquid crystal display (LCD) have actively been developed.

The PDP is a display device for displaying characters or images using plasma generated by gas discharge, and the OLED display displays characters or images using an electric field to cause a specific organic material or a high polymer to emit light. The LCD applies an electric field to a liquid crystal layer between two display panels and regulates the magnitude of the electric field so as to regulate the transmittance of light passing through the liquid crystal layer, thereby realizing desired images.

Among flat panel displays, as examples, the LCD and the OLED display respectively include a display panel provided with a pixel including a switching element and a display signal line, a gate driver for sending a gate signal to a gate line among display signal lines so as to turn on/off the switching element of the pixel, a gray voltage generator for generating a plurality of gray voltages, a data driver for selecting a voltage corresponding to an image data among gray voltages as a data voltage and applying the data voltage to a data line among the display signal lines, and a signal controller for controlling these elements.

A display panel unit includes a display area in which most of the pixels and the display signal lines are formed, and a peripheral area outside the display area.

A floating bar, which is made of the same layer as a gate line and crosses a data line, is disposed in the peripheral area, and a diode for preventing static electricity is connected between the data line and the floating bar so that static electricity flowing into the data line can be dispersed, thereby protecting the data line. Such floating bar is usually formed of the same layer as the gate line.

The floating bar is formed in a bar shape in a horizontal direction respectively above and below the peripheral area. During or after the manufacturing of the display device, the floating bar may become short-circuited with the data line because of minute particles, etc. This may cause a load at the data line so as to cause a delay therein, so there may be a problem in that images are not properly displayed.

The above information disclosed in this Background section is only for enhancement of understanding of the background of the invention and therefore it may contain information that does not form the prior art that is already known in this country to a person of ordinary skill in the art.

SUMMARY OF THE INVENTION

An exemplary embodiment of the present invention has been made in an effort to provide a display device having the advantages of preventing a delay of a data signal.

An exemplary embodiment of the present invention provides a display device including a plurality of pixels having a data line for transmitting a data voltage to the pixel, and a floating bar crossing the data line and being divided into a plurality of pieces.

The display device may further include a first diode connected to the floating bar and the data line, and the first diode may be a bidirectional diode.

The display device may include a display area in which the pixel is disposed and a peripheral area outside the display area, and the floating bar may be respectively positioned above and below the peripheral area.

The display device may further include a second diode connected to the neighboring pieces of the floating bar.

The first and second diodes may be bidirectional diodes.

The display device may include a display area in which the pixel is disposed and a peripheral area outside the display area, and the floating bar may be respectively positioned above and below the peripheral area.

BRIEF DESCRIPTION OF THE DRAWINGS

Exemplary embodiments of the present invention will be understood in more detail from the following detailed descriptions taken in conjunction with the accompanying drawings, in which.

DETAILED DESCRIPTION OF EXEMPLARY EMBODIMENTS

The present invention will be described more fully hereinafter with reference to the accompanying drawings, in which exemplary embodiments of the invention are shown.

First, a display device according to an exemplary embodiment of the present invention will be explained in detail with reference to FIG. 1 and FIG. 2, and the explanation will be given using the example of a liquid crystal display.

Figure 1:
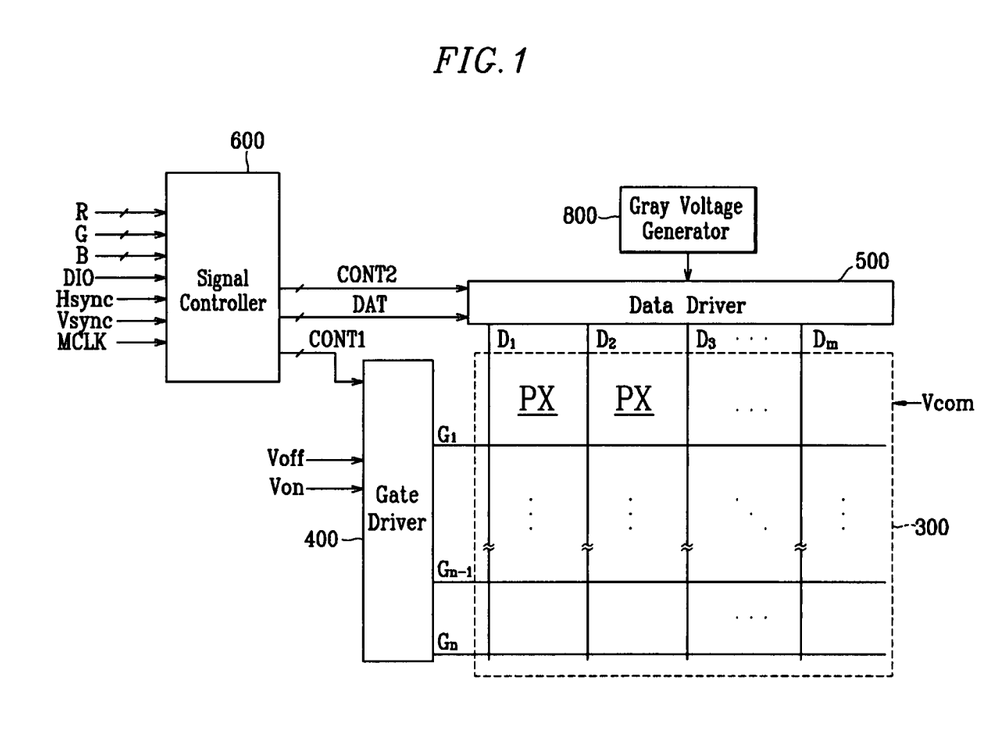
FIG. 1 is a block diagram of a liquid crystal display according to an exemplary embodiment of the present invention.
Figure 2:
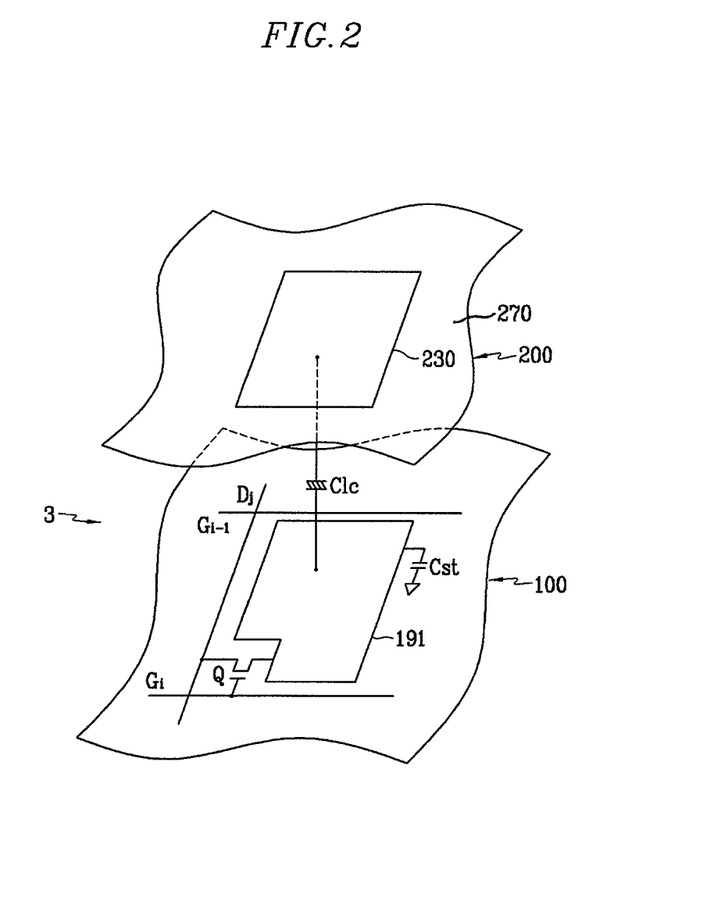
FIG. 2 is an equivalent circuit diagram of one pixel of a liquid crystal display according to an exemplary embodiment of the present invention.

FIG. 1 is a block diagram of a liquid crystal display according to an exemplary embodiment of the present invention, and FIG. 2 is an equivalent circuit diagram of one pixel of a liquid crystal display according to an exemplary embodiment of the present invention.

As shown in FIG. 1, a liquid crystal display according to an exemplary embodiment of the present invention includes a liquid crystal panel assembly 300, a gate driver 400 and a data driver 500 connected to the liquid crystal panel assembly 300, a gray voltage generator 800 connected to the data driver 500, and a signal controller 600 controlling these elements.

The liquid crystal panel assembly 300 is connected to a plurality of signal lines $G_1$ to $G_n$ and $D_1$ to $D_m$, from a point of view of an equivalent circuit, and includes a plurality of pixels PX approximately arranged in a matrix shape. Further, referring to FIG. 2, the liquid crystal panel assembly 300 includes a lower panel 100, an upper panel 200, and a liquid crystal layer 3 between the upper and lower panels 200 and 100.

The signal lines $G_1$ to $G_n$ and $D_1$ to $D_m$ include a plurality of gate lines $G_1$ to $G_n$ that transmit gate signals (also referred to as "scanning signals"), and a plurality of data lines $D_1$ to $D_m$ that transmit data signals. The gate lines $G_1$ to $G_n$ substantially extend in a row direction and are parallel to one another, and the data lines $D_1$ to $D_m$ substantially extend in a column direction and are also parallel to one another.

Each pixel PX, for example, the pixel PX connected to the i-th (i=1, 2, ..., n) gate line $G_i$ and the j-th (j=1, 2, ..., m) data line Dj includes a switching element Q connected to the signal lines $G_i$ and $D_j$, and a liquid crystal capacitor Clc and a storage capacitor Cst connected to the switching element Q. If desired, the storage capacitor Cst can be omitted.

The switching element Q is a three terminal element, such as a thin film transistor, etc., provided to the lower panel 100, and a control terminal thereof is connected to the gate line $G_i$, an input terminal thereof is connected to the data line $D_j$, and an output terminal thereof is connected to the liquid crystal capacitor Clc and the storage capacitor Cst.

The liquid crystal capacitor Clc has two terminals, one connected to a pixel electrode 191 of the lower panel 100 and the other connected to a common electrode 270 of the upper panel 200. The liquid crystal layer 3 between the two electrodes 191 and 270 serves as a dielectric material. The pixel electrode 191 is connected to the switching element Q, and the common electrode 270 is formed on the entire surface of the upper panel 200. A common voltage Vcom is applied to the common electrode 270. Unlike what is shown in FIG. 2, the common electrode 270 may be provided on the lower panel 100. In this case, at least one of the two electrodes 191 and 270 can be formed in a linear or bar shape.

The storage capacitor Cst, which assists the liquid crystal capacitor Clc, has a separate signal line (not shown) that overlaps the pixel electrode 191 provided on the lower panel 100 with an insulator interposed therebetween. A fixed voltage such as the common voltage Vcom is applied to the separate signal line. The storage capacitor Cst, however, may be formed by the pixel electrode 191 and the overlying previous gate line arranged to overlap each other through the insulator.

In order to provide a color display, each pixel PX uniquely displays one of the primary colors (spatial division) or each pixel PX alternately displays the primary colors (temporal division) over time, and a desired color is recognized by a spatial and temporal sum of the primary colors. Examples of the primary colors include the three primary colors of red, green, and blue. FIG. 2 shows an example of a spatial division. In this example, each pixel PX has a color filter 230 for one of the primary colors in a region of the upper panel 200 corresponding to the pixel electrode 191. Unlike what is shown in FIG. 2, the color filter 230 may be formed above or below the pixel electrode 191 of the lower panel 100.

At least one polarizer (not shown) for polarizing light is attached to an outer surface of the liquid crystal panel assembly 300.

Referring again to FIG. 1, the gray voltage generator 800 generates two sets of gray voltages related to the light transmittance of the pixel PX (reference gray voltages). One set of the two sets of gray voltages has a positive value and the other has a negative value with respect to the common voltage Vcom.

The gate driver 400 is connected to the gate lines $G_1$ to $G_n$ of the liquid crystal panel assembly 300, and applies the gate signals, which are combinations of a gate-on voltage Von and a gate-off voltage Voff, to the gate lines $G_1$ to $G_n$.

The data driver 500 is connected to the data lines $D_1$ to $D_m$ of the liquid crystal panel assembly 300. The data driver 500 selects one of the gray voltages from the gray voltage generator 800, and applies the selected gray voltage to the data lines $D_1$ to $D_m$ as a data signal. When the gray voltage generator 800 supplies the reference gray voltages of a predetermined number rather than the voltages for all gray levels, however, the data driver 500 divides the reference gray voltages so as to generate the gray voltages for all gray levels and selects the data voltage from among them.

The signal controller 600 controls the gate driver 400, the data driver 500, etc.

Each of the drivers and circuits 400, 500, 600, and 800 may be directly mounted on the liquid crystal panel assembly 300 in the form of at least one IC chip, may be attached to the liquid crystal panel assembly 300 in a type of TCP (tape carrier package) while being mounted on a flexible printed circuit film (not shown), or may be mounted on a separate printed circuit board (PCB). Alternately, the drivers and circuits 400, 500, 600, or 800 may be integrated into the liquid crystal panel assembly 300, together with the signal lines $G_1$ to $G_n$ and $D_1$ to $D_m$ and the thin film transistor switching element Q. The drivers and circuits 400, 500, 600, and 800 may be integrated into a single chip. In this case, at least one of them or at least one circuit element constituting the drivers and circuits may be positioned outside the single chip.

The operation of the liquid crystal display will now be described in detail.

The signal controller 600 receives input image signals R, G, and B and input control signals for controlling display of the input image signals R, G, and B from an external graphics controller (not shown). Examples of the input control signals include a vertical synchronization signal Vsync, a horizontal synchronizing signal Hsync, a main clock signal MCLK, a data enable signal DIO, and so on.

The signal controller 600 processes the image signals R, G, and B according to the operating condition of the liquid crystal panel assembly 300 on the basis of the input image signals R, G, and B and the input control signals, and generates a gate control signal CONT1 and a data control signal CONT2. Then, the signal controller 600 supplies the gate control signal CONT1 to the gate driver 400 and supplies the data control signal CONT2 and the processed image signal DAT to the data driver 500.

The gate control signal CONT1 includes a scanning start signal that instructs to start scanning and at least one clock signal for controlling an output time of a gate-on voltage Von. The gate control signal CONT1 may also further include an output enable signal for limiting a duration time of the gate-on voltage Von.

The data control signal CONT2 includes a horizontal synchronization start signal that notifies transmission of image data to one row (set) of pixels PX, a load signal for instructing to apply the data signal to the data lines $D_1$ to $D_m$, and a data clock signal. The data control signal CONT2 may also further include an inversion signal for inverting the voltage polarity of the data signal relative to the common voltage Vcom, hereinafter, the voltage polarity of the data signal relative to the common voltage is simply referred to as the polarity of the data signal.

On the basis of the data control signal CONT2 from the signal controller 600, the data driver 500 receives a digital image signal DAT for one row (set) of pixels PX, and selects the gray voltage corresponding to each digital image signal DAT. Then, the data driver 500 converts the digital image signal DAT into the analog data signal, and applies the analog data signal to the data lines $D_1$ to $D_m$.

The gate driver 400 applies the gate-on voltage Von to the gate lines $G_1$ to $G_n$ on the basis of the gate control signal CONT1 from the signal controller 600 so as to turn on the switching element Q connected to the gate lines $G_1$ to $G_n$. Accordingly, the data signal applied to the data lines $D_1$ to $D_m$ is applied to the corresponding pixel PX through the turned-on switching element Q.

A difference between the voltage of the data signal applied to the pixel PX and the common voltage Vcom becomes a charge voltage of the liquid crystal capacitor Clc, that is, a pixel voltage. The alignment of liquid crystal molecules varies according to the value of the pixel voltage and, thus, the polarization of light passing through the liquid crystal layer 3 is changed. The change in polarization causes a change in the transmittance of light by the polarizers attached to the display panel assembly 300.

By repeating this operation for every horizontal period, which is referred to as "1H" and which is equal to one cycle of the horizontal synchronizing signal Hsync and the data enable signal, the gate-on voltage Von is sequentially applied to all of the gate lines $G_1$ to $G_n$, and the data signal is applied to all of the pixels PX, so that an image of one frame is displayed.

When one frame is completed and the next frame starts, the state of the inversion signal to be applied to the data driver 500 is controlled such that the polarity of the data voltage to be applied to each pixel is opposite to the polarity thereof in the previous frame ("frame inversion"). At this time, the polarity of the data voltage on one data line may be changed in one frame according to the characteristics of the inversion signal, for example, row inversion or dot inversion, or the polarities of the data signals applied to rows of pixels may be different from each other, for example, column inversion or dot inversion.

A structure of a floating bar of a liquid crystal display according to an exemplary embodiment of the present invention will now be described in detail with reference to FIG. 3 to FIG. 5.

Figure 3:
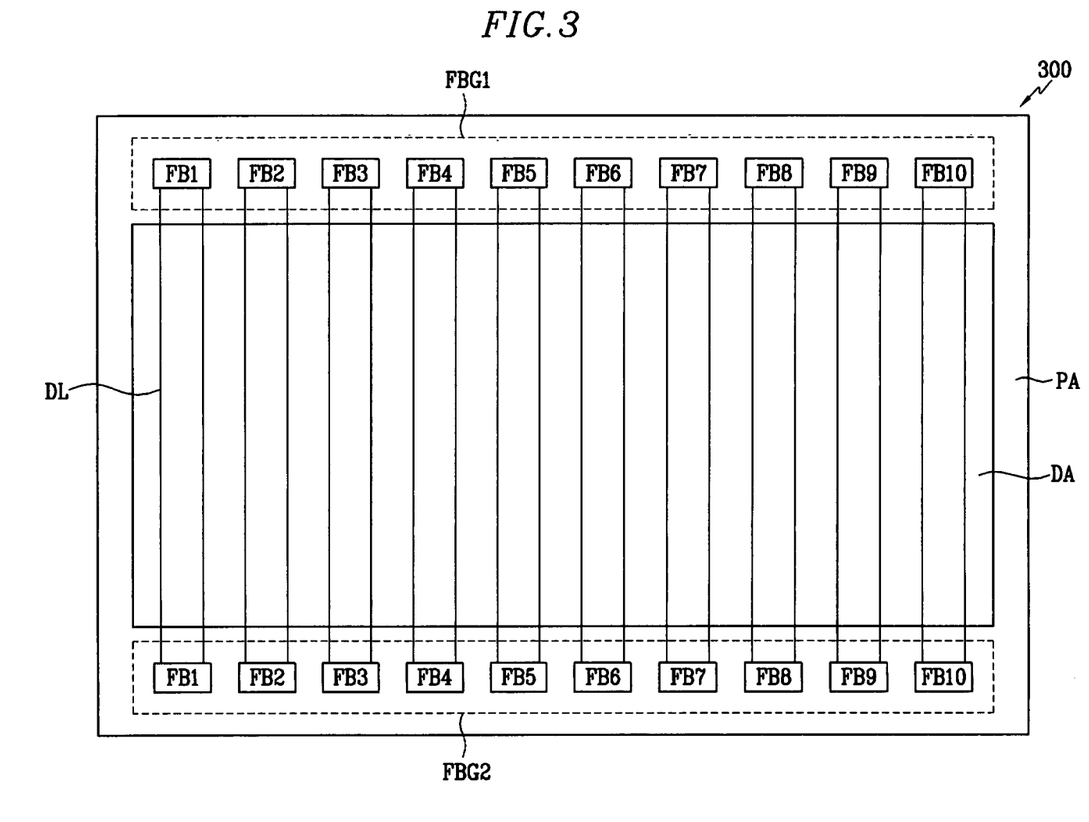
FIG. 3 is a drawing showing the disposition of a floating bar of a liquid crystal display according to an exemplary embodiment of the present invention.
Figure 4:
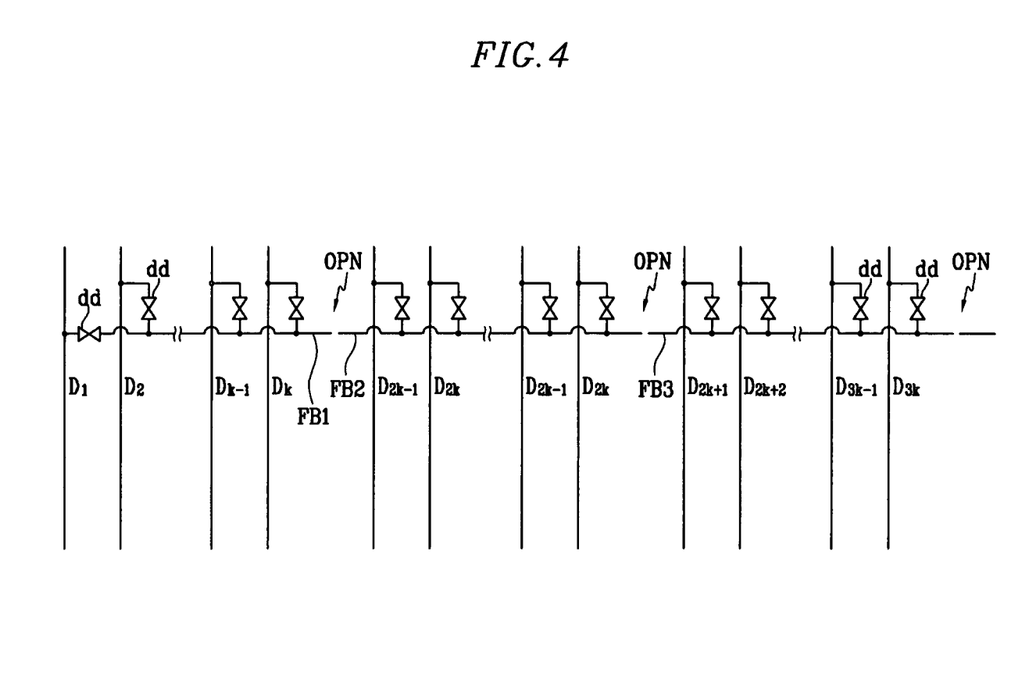
FIG. 4 is a drawing showing the disposition of a floating bar shown in FIG. 3 according to an exemplary embodiment of the present invention.
Figure 5:
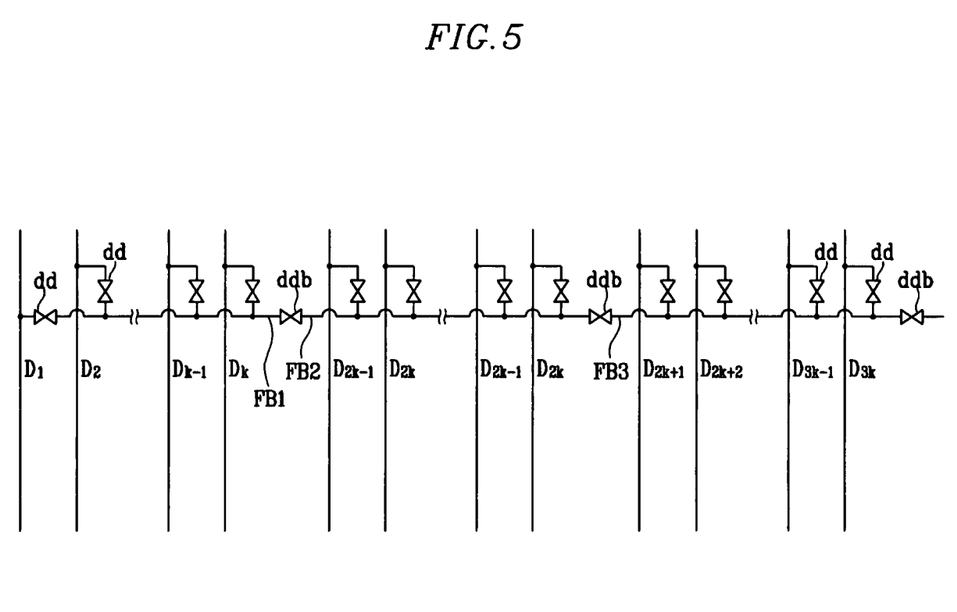
FIG. 5 is a drawing showing the disposition of a floating bar shown in FIG. 3 according to an exemplary embodiment of the present invention.

FIG. 3 is a drawing showing the disposition of a floating bar of a liquid crystal display according to an exemplary embodiment of the present invention, FIG. 4 is a drawing showing the disposition of a floating bar shown in FIG. 3 according to an exemplary embodiment of the present invention, and FIG. 5 is a drawing showing the disposition of a floating bar shown in FIG. 3 according to an exemplary embodiment of the present invention.

Referring to FIG. 3, the liquid crystal panel assembly 300 of a liquid crystal display according to an exemplary embodiment of the present invention includes a display area DA and a peripheral area PA outside the display area DA. Most of the signal lines $G_1$ to $G_n$ and $D_1$ to $D_m$ and the pixels PX shown in FIG. 1 and FIG. 2 are formed in the display area DA, and floating bar bundles FBG1 and FBG2 respectively comprised of floating bar pieces FB1 to FB10 are disposed above and below the peripheral area PA. FIG. 3 exemplarily shows that the floating bar is divided into ten floating bar pieces FB1 to FB10, and the number of pieces can be variously changed. Reference character "DL" indicates a data line.

FIG. 4 is an enlarged view of the floating bar pieces shown in FIG. 3, and particularly shows three floating bar pieces FB1 to FB3 among the floating bar pieces FB1 to FB10 disposed above the liquid crystal panel assembly 300.

Respective floating bar pieces FB1 to FB3 are physically disconnected from each other at separation areas OPN, and they cross a specific number of the data lines DL. FIG. 4 exemplarily shows that the floating bar pieces are separated every k data lines DL. The number of floating bar pieces FB1 to FB10 can be arbitrarily determined within a range in which a signal delay does not occur.

Diodes dd are, respectively connected to the floating bar pieces FB1 to FB3 and the crossing data lines $D_1$ to $D_k$, $D_{k+1}$ to $D_{2k}$, and $D_{2k+1}$ to $D_{3k}$. In the event of an inflow of static electricity into the data lines $D_1$ to $D_k$, $D_{k+1}$ to $D_{2k}$, and $D_{2k+1}$ to $D_{3k}$, the static electricity will be dispersed by the diodes dd. Each diode dd is a bidirectional diode, that is, a so-called back-to-back diode, and it disperses static electricity from the data lines $D_1$ to $D_k$, $D_{k+1}$ to $D_{2k}$, and $D_{2k+1}$ to $D_{3k}$ to the floating bar pieces FB1 to FB3.

Accordingly, even when one of the floating bar pieces FB1 to FB10 is short-circuited with a data line DL, a load acting on the data line DL can be substantially reduced when compared to the prior art in which the floating bar is formed as one bar, so that a signal delay can be prevented.

The structure of a floating bar shown in FIG. 5 is substantially the same as that of the floating bar shown in FIG. 4. In FIG. 5, the floating bar is divided into floating bar pieces FB1 to FB3 every specific number of data lines, and it crosses the data lines $D_1$ to $D_k$, $D_{k+1}$ to $D_{2k}$, and $D_{2k+1}$ to $D_{3k}$. The only difference from FIG. 4 is that diodes ddb connect the neighboring floating bar pieces. The diode ddb may also be a bidirectional diode. The diode ddb is only turned on when a very high voltage, such as static electricity, or a very high current, such as caused by static electricity, is present or flows therethrough. Otherwise, diode ddb is turned off. Accordingly, in a normal situation in which there is no inflow of static electricity, the structure of FIG. 5 may be considered to be the same as the structure shown in FIG. 4. Therefore, a load can be minimized when the floating bar bundles FBG1 and FBG2 are short-circuited with the data line DL, and an effect of dispersing static electricity when an inflow of static electricity occurs can be more advantageously enhanced over that of the exemplary embodiment shown in FIG. 4.

As such, since the floating bar is disposed to be divided into a plurality of pieces, a delay of the data signal can be prevented, thereby displaying excellent images. Furthermore, since the diode ddb is disposed between the floating bar pieces FB1 to FB10, the effect of dispersing static electricity can be maximized.

While this invention has been described in connection with what is presently considered to be exemplary embodiments, it is to be understood that the present invention is not limited to the disclosed embodiments, but, on the contrary, is intended to cover various modifications and equivalent arrangements included within the spirit and scope of the appended claims.

What is claimed is:

1. A display device including a plurality of pixels, comprising:
   a plurality of data lines for transmitting data voltages to the plurality of pixels;
   a first floating bar being divided into a plurality of disconnected first pieces, each of the plurality of first pieces crossing a plurality of consecutive data lines different from each other, but fewer than all of the plurality of data lines; and
   a plurality of first diodes respectively connected to the plurality of data lines and to the first floating bar,
   wherein the display device comprises a display area in which the plurality of pixels are disposed and a peripheral area outside the display area, the peripheral area including a first peripheral area positioned above the display area and a second peripheral area positioned below the display area, the plurality of first pieces of the first floating bar are positioned in one of the first peripheral area and the second peripheral area, and the plurality of first pieces of the first floating bar are arranged in a direction in which each of the first pieces substantially extends.

2. The display device of claim 1, wherein each of the plurality of diodes is a bidirectional diode.

3. The display device of claim 2, wherein the display device comprises a second floating bar being divided into a plurality of disconnected second pieces, all of the plurality of second pieces crossing at least one data line of the plurality of data lines, wherein the plurality of second pieces of the second floating bar are positioned in the rest one of the first peripheral area and the second peripheral area where the plurality of first pieces of the first floating bar are not positioned.

4. The display device of claim 3, wherein the display device further comprises a plurality of second diodes being respectively connected to the plurality of data lines and to the second floating bar.

5. The display device of claim 3, wherein the plurality of second pieces are horizontally spaced apart and arranged in a row.

6. The display device of claim 1, the plurality of first pieces are horizontally spaced apart and arranged in a row.

7. A display device including a plurality of pixels, comprising:

a plurality of data lines for transmitting data voltages to the pixels;

a first floating bar being divided into a plurality of first pieces, each of the plurality of pieces crossing a plurality of consecutive data lines different from each other, but fewer than all of the plurality of data lines; and a plurality of first diodes connecting neighboring pieces of the plurality of first pieces to each other, wherein the display device comprises a display area in which the plurality of pixels are disposed and a peripheral area outside the display area, the peripheral area including a first peripheral area positioned above the display area and a second peripheral area positioned below the display area, and the plurality of first pieces of the first floating bar are positioned in one of the first peripheral area and the second peripheral area, the plurality of first pieces of the first floating bar are arranged in a direction in which each of the first pieces substantially extends.

8. The display device of claim 7, further comprising a plurality of second diodes connected to the first floating bar and to the plurality of data lines, respectively.

9. The display device of claim 8, wherein the first and second diodes are bidirectional diodes.

10. The display device of claim 7, wherein the display device comprises a second floating bar being divided into a plurality of second pieces, all of the plurality of second pieces crossing at least one data line of the plurality of data lines, wherein the plurality of second pieces of the second floating bar are positioned in the rest one of the first peripheral area and the second peripheral area where the plurality of first pieces of the first floating bar are not positioned.

11. The display device of claim 10, the plurality of second pieces are horizontally spaced apart and arranged in a row.

12. The display device of claim 10, further comprising a plurality of third diodes, the plurality of third diodes connecting neighboring pieces of the plurality of second pieces to each other.

13. The display device of claim 7, the plurality of first pieces are horizontally spaced apart and arranged in a row.

* * * * *